March 8, 1960 W. H. EGGERS 2,927,561
AUTOMOBILE MOISTURE AND BRAKING APPARATUS
Filed May 28, 1951 2 Sheets-Sheet 1
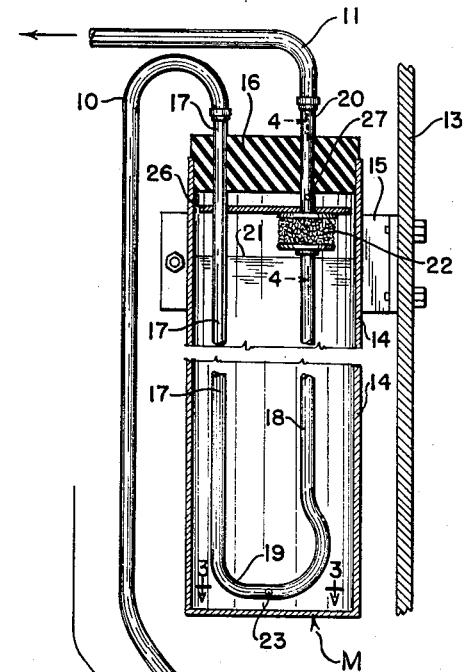
FIG.—1
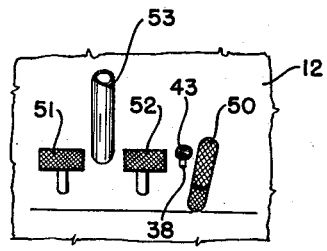
FIG.—5
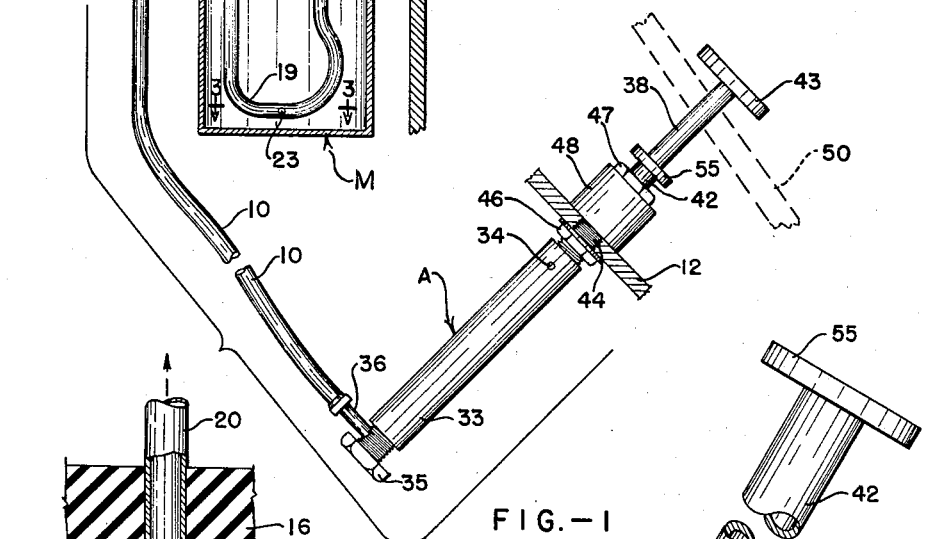
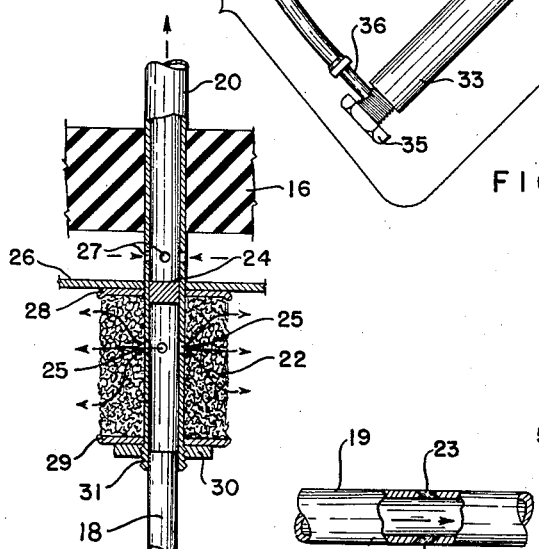
FIG.—4 FIG.—3
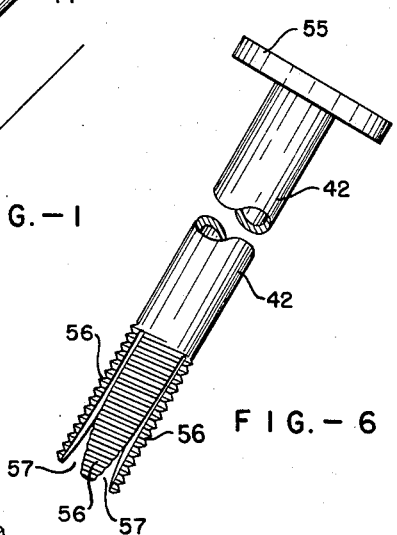
FIG.—6
INVENTOR.
William H. Eggers
BY
Lamphere + Van Valkenburgh
ATTORNEYS March 8, 1960 W. H. EGGERS 2,927,561
AUTOMOBILE MOISTURE AND BRAKING APPARATUS
Filed May 28, 1951 2 Sheets-Sheet 2
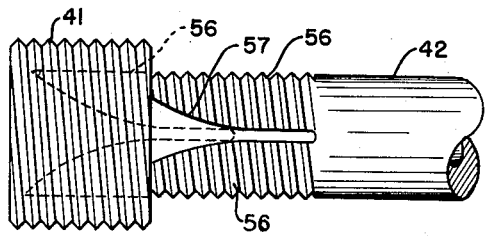
FIG.—7
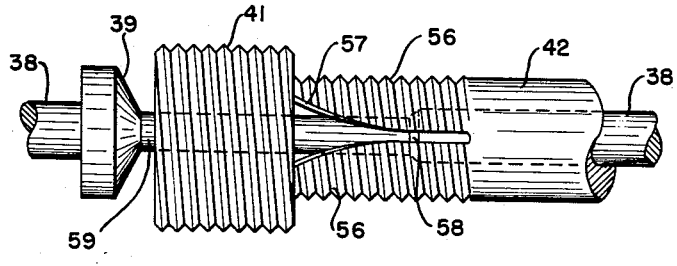
FIG.—8
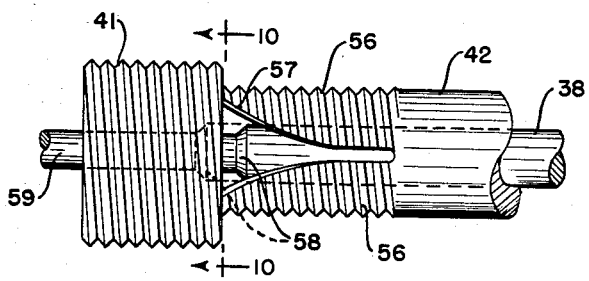
FIG.—9
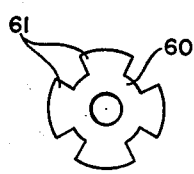
FIG.—10
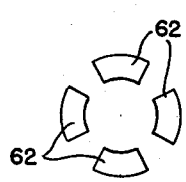
FIG.—11
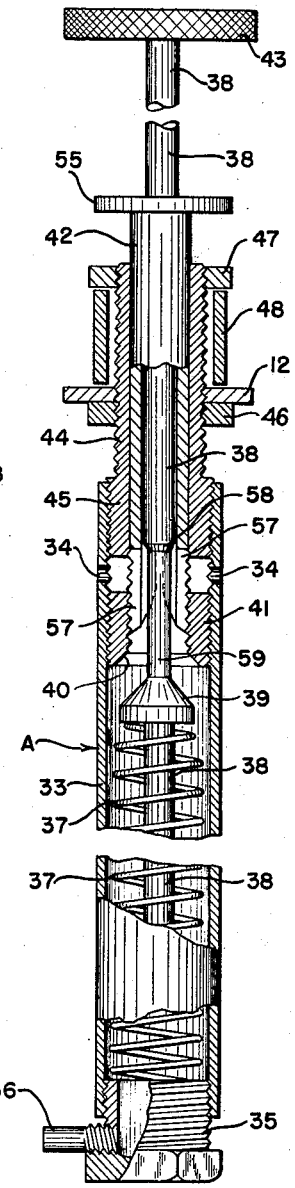
FIG.—2
INVENTOR.
William H. Eggers
BY
Lamphere & Van Valkenburgh
ATTORNEYS United States Patent Office 2,927,561
Patented Mar. 8, 1960

2,927,561

AUTOMOBILE MOISTURE AND BRAKING APPARATUS

William H. Eggers, Estes Park, Colo.

Application May 28, 1951, Serial No. 228,618

12 Claims. (Cl. 123—25)

This invention relates to apparatus for supplying water vapor or moisture to an internal combustion engine, such as an autmobile engine, and more particularly to apparatus which will supply water vapor or moisture, when desired, to an automobile engine and may also be utilized to enhance the braking effect of an automobile engine.

It has been recognized for some time that an internal combustion engine operating on the Otto or Beau de Rochas cycle, such as conventional in automobiles, can be operated more effectively or efficiently if water vapor or moisture is supplied thereto, particularly when the relative humidity of the atmospheric air normally drawn into the engine is comparatively low. Previous devices for this purpose have, in general, suffered from the defect that the amount of moisture supplied to the engine is generally not readily controllable. Also starting is usually more difficult if additional air, moisture or water vapor is supplied to the engine.

When driving downhill, it is common practice to utilize the braking effect of the engine, so as to reduce the use of the brakes and thus increase brake life. However, particularly when going down a steep hill, and the carburetor throttle is permitted to remain at minimum opening, a high suction is developed in the intake manifold, so that the compression produced in the engine cylinders is reduced proportionately, thereby decreasing the braking effect. Also, the high suction tends to draw additional oil into the cylinders, which tends to remain unburned until more complete combustion is resumed, thereby not only increasing the oil consumption but also tending to produce or increase carbon deposits in the cylinders. Such condition is often evidenced by the discharge of oil smoke from the exhaust when the throttle is again opened, aften an automobile has been going downhill. To open the carburetor throttle to reduce the manifold pressure, when going downhill, results in an increased flow of gasoline to the engine, thereby increasing the speed of the engine, so that the effect is exactly opposite to that desired.

Among the objects of the present invention are to provide improved apparatus for supplying moisture or water vapor to an internal combustion engine; to provide such apparatus which will effectively vaporize or subdivide the water being supplied to the engine; to provide such apparatus which is particularly useful on vehicles propelled by an internal combustion engine, namely, automobiles and the like; to provide such apparatus which will automatically supply desired amounts of water vapor to the engine, in accordance with the throttle position; to provide such apparatus which may be adjusted for individual engines and for different climatic conditions; to provide such apparatus which may also be utilized to increase the braking effect of an engine, such as when the automobile is going downhill; and to provide such apparatus which is comparatively simple in construction and the parts of which are readily installed.

Additional objects and the novel features of this invention will become apparent from the description which follows, taken in connection with the accompanying drawings, in which:

Fig. 1 is a composite vertical section of apparatus for supplying moisture or water vapor to an automobile engine constructed in accordance with this invention;

Fig. 2 is an enlarged longitudinal section of an air control device forming a part of the apparatus of Fig. 1;

Fig. 3 is an enlarged horizontal section, taken along line 3—3 of Fig. 1;

Fig. 4 is an enlarged vertical section taken along line 4—4 of Fig. 1;

Fig. 5 is a fragmentary elevation of a portion of the floorboard of an automobile, illustrating the preferred position of an air control valve foot pedal of the apparatus of this invention;

Fig. 6 is a view, on an enlarged scale, of an air flow adjusting sleeve forming a part of the air control device of Fig. 2;

Fig. 7 is a further enlarged, fragmentary side view of a portion of the sleeve of Fig. 6 in association with a bushing, illustrating the relative positions of the sleeve and the bushing, which provide adjustment for air flow in the control device;

Fig. 8 is a fragmentary side elevation similar to Fig. 7, but with a control rod added thereto, illustrating the position of maximum air flow;

Fig. 9 is a view similar to Fig. 8, illustrating other positions, of reduced air flow;

Fig. 10 is a diagram corresponding to a section taken along line 10—10 of Fig. 9, but showing in outline the cross sectional area available for air flow; and Fig. 11 is an air flow diagram similar to Fig. 10, but showing in outline the area available for air flow in another position of the control rod.

As illustrated in Fig. 1, the apparatus of this invention may comprise an air control device A in association with a moisture entrainment device M, the air control device A being connected by an air tube 10 with the moisture entrainment device M, and the latter by a moisture tube 11 with the intake manifold of the engine. The tubes 10 and 11 may be flexible tubes, such as formed of rubber or plastic, or a metal which may be bent to a desired shape, such as copper. For a downdraft carburetor, the moisture supply tube 11 may terminate in a tube extending horizontally into the manifold supply pipe below the carburetor, with its end cut off at 45° with the opening facing downwardly. The air control device A may conveniently be installed on the floorboard 12 of an automobile, while the moisture entrainment device M may be installed on the engine side of the front panel 13, the device M including a jar 14 adapted to contain water and preferably made of glass or other transparent material, so that the water level in the jar may be observed, to facilitate refilling when necessary. The jar 14 may be mounted on the front pane 13 by a bracket 15, or in other suitable manner, and the top of the jar closed by a stopper 16, made of rubber or similarly suitable material, although the top of the jar may be provided with a screw top or other lid having a suitable filling connection, so that the jar may be refilled without removing the stopper or other closure for the top of the jar, in which case the tubes 10 and 11 may be made of metal, if desired. It will be evident, of course, that in freezing weather, the water in jar 14 may also contain alcohol or any other suitable additive to reduce the possibilities of freezing, and therefore that when reference is made herein to "water," "moisture" or "water vapor," such terms include such additives.

The air tube 10 is connected to a longer leg 17 of an inlet tube of the moisture entrainment device M, the inlet tube having also a shorter leg 18 disposed in spaced relation thereto and the legs 17 and 18 being connected at the bottom by a transverse portion 19. Thus, the inlet tube is preferably U-shaped, with one leg 17 longer than the other leg 18 so that the longer leg 17 will extend through the stopper 16 and the transverse portion 19 will be disposed adjacent the bottom of jar 14. Moisture tube 11 is connected to an outlet tube 20, which also extends through the stopper 16, or top of the jar 14. As shown in Fig. 4, the inlet tube may have a slightly smaller diameter than the outlet tube 20, or the upper end of the shorter leg 18 of the inlet tube diminished in diameter, so that it will fit into the lower end of tube 20. This is desirable for assembly purposes, as will appear later.

The jar 14 may be filled with water, or a mixture of water and alcohol or the like, up to a level 21, just beneath an annular, water dispersion cartridge 22, which will be described later. During use, the water level will be lowered as water is used, and the jar is preferably refilled at the time or before the level reaches the transverse portion 19 of the inlet tube, in which a pair of aspirating holes 23 are located. As in Fig. 3, the aspirating holes 23 are preferably inclined inwardly, in the direction of the flow of air through the inlet tube, as indicated by the arrow of Fig. 3, so that water from the lower end of the jar will be drawn into the tube and carried by the air to the upper end of the short leg for discharge into the interior of cartridge 22.

As shown in Fig. 4, the outlet tube 20 may be divided by a solid plug 24 into upper and lower sections, the lower section being provided with a plurality of holes 25, such as four in number and spaced around tube 20, by which the air carrying the water is discharged into the cartridge 22, which may be formed of metal fibers, such as so-called copper "wool," or other suitable rust resistant material, so formed as to provide a plurality of comparatively small sized interstices or passages disposed in labyrinth arrangement. The water carried by the air is forced to pass through the cartridge 22, which results in the water becoming more finely divided, so that the water, in following various paths through the cartridge, such as indicated generally by the arrows of Fig. 4, will emerge from the cartridge in the form of vapor or a finely divided mist. To insure a maximum entrainment of moisture, the moistened air is not passed directly to the upper section of outlet tube 20, but rather is forced to flow around the edges of a transverse baffle plate 26, which may be slightly smaller in diameter than the inside of jar 14, or may touch the inside of the jar 14 at one or more points, so as to leave an annular space or a series of spaces around its edge. After flow around the edges of the baffle plate 26, the air carrying the moisture enters the upper section of the outlet tube 20 through a series of holes 27, such as four in number and spaced about the tube 20 above baffle 26 and, of course, above the plug 24. The moistened air then flows through the outlet tube 20 and through the tube 11, to be carried to the intake manifold.

The plug 24 may be positioned within the tube 20 in any suitable manner, and then brazed or soldered in place, while the baffle plate 26 may be attached to the tube 20 in any suitable manner, as by brazing or soldering, conveniently at the same time that the plug 24 is fastened in position. The cartridge 22, which is preformed, as by taking a mass of copper "wool" or the like and pressing the same into shape, as in a die, is held between an upper washer 28, which abuts against baffle plate 26, and a lower washer 29, which is compressed against the cartridge 22 by a nut 30 engaging exterior threads 31 at the lower end of tube 20, the latter being thickened if desired, as shown in Fig. 4, to provide greater thickness for the threads. The preferable permanent attachment of baffle plate 26 on tube 20 requires the cartridge 22 to be slipped onto tube 20 from the lower end, this being facilitated by the fact that leg 18 of the inlet tube may be slipped into the lower end of tube 20 after the cartridge 22 is mounted thereon.

The specific construction is not, of course, necessary for all installations. For instance, upper tube 20 may terminate at or just below baffle plate 26, such as by being provided with a flared end to support the baffle plate with a cap or plug sealing its lower end. Cartridge 22 may then be provided with several longitudinal holes through which bolts, cotter pins, or the like may extend, to fasten the cartridge 22 between the baffle plate 26 and the lower washer 29, thereby eliminating the threading of tube 20. In such instance, the shorter leg 18 of the inlet tube may extend merely into the central hole in the cartridge, with a rubber gasket adapted to be pushed up against the washer 29 being provided for sealing purpose. It will further be understood that other suitable means for supplying air to carry water and force the same through the cartridge may be employed.

The air control device A, as illustrated in Figs. 1 and 2, may comprise a tubular casing 33, interiorly threaded at each end and having a series of air inlet holes 34, such as four in number and equally spaced around the tube adjacent to but spaced from its upper end. The lower end of the casing may be closed by an internal cap 35, threadedly engaging the interior of casing 33, and provided with a nipple 36 for attachment of tube 10. Cap 35 also forms a seat or abutment for the lower end of a compression spring 37, which surrounds the lower end of a valve rod 38 and whose upper end abuts against the underside of a valve cone 39, formed integrally with rod 38 or attached thereto in a suitable manner, as by welding or brazing. Valve cone 39 cooperates with a conical valve seat 40, formed at the lower end of an annular bushing 41 and preferably beveled at the same angle as valve cone 39. Bushing 41 is threaded both exteriorly and interiorly, the former for positioning within the threaded upper end of tube 33, just below air holes 34, and the latter for receiving the threaded lower end of an adjustable air flow control sleeve 42, which is also shown in Fig. 6 and will be described in additional detail later. The valve rod 38 extends upwardly through sleeve 42 to some distance thereabove, and is provided at its upper end with a head or air pedal 43, while the upper end of the casing 33 is closed by an attachment sleeve 44 which is threaded on the outside and smooth on the inside, the latter to permit axial movement of air flow adjustment sleeve 42. Attachment sleeve 44 may be uniform in diameter, or vary, such as being provided at its lower end with a thicker section 45, exteriorly threaded to engage the threaded inside of casing 33, as shown, or the lower end of sleeve 44 may be flared outwardly and exteriorly threaded. The remaining exterior threads of the sleeve 44 permit attachment, as well as axial adjustment of the position of pedal 43 of air control device A, such as to floorboard 12 of the passenger compartment of an automobile, as by means of a lower nut 46 and an upper nut 47, the latter being adapted to press an annular bushing 48 against the floorboard 12, which may be covered with a rubber mat or the like (not shown), since tightening the upper nut 47 directly against the rubber mat may be undesirable. Also, the lower end of bushing 48 may be beveled, to position the axis of rod 38 at a desired angle to the floorboard 12.

As shown in Figs. 1 and 5, the valve rod 38 is preferably positioned alongside the conventional carburetor throttle pedal 50, with the head or air pedal 43 normally disposed above the throttle pedal, as indicated by the dotted line position of the latter in Fig. 1. In Fig. 5, a conventional clutch pedal 51, brake pedal 52, and steering column 53 are indicated, a convenient position for valve rod 38 and its head or air pedal 43 being on the side of the throttle pedal 50 next to the brake pedal 52. As will be evident from Figs. 1 and 5, the throttle pedal 50 and air pedal 43 may be depressed simultaneously, by the operator of the automobile covering both with his foot, while the throttle pedal 50 may be depressed independently of the air pedal 43, and the air pedal 43 may also be depressed independently of the throttle pedal 50. Generally, when the air pedal 43 is to be depressed independently of the throttle pedal 50, it is desirable to depress the former only a short distance, to produce maximum air flow, which is possible, as will be described later. Thus, the operator may depress the air pedal 43 to a point at which his foot merely touches the throttle pedal 50, but without depressing the throttle pedal 50 a significant amount. This latter position is particularly useful in feeding a maximum amount of air into the engine for braking purposes, as will be explained more fully later.

The air adjustment flow sleeve 42, as illustrated in Fig. 6, is tubular and provided with an annular flange 55 at the upper end and a plurality of threaded segments 56 at the lower end, the latter being formed by a series of longitudinal slots 57, such as four in number, the configuration of the slots preferably being such that they are comparatively wide at the lower end of the sleeve, with the sides thereof tapering upwardly to a relatively narrow width at their upper ends. The valve rod 38, which moves axially within sleeve 42, is also provided with a shoulder 58 forming the upper terminal of a reduced section 59 extending between valve cone 39 and shoulder 58, shoulder 58 preferably being spaced from the valve cone 39 a distance slightly greater than the length of the slots 57 in sleeve 42, i.e. so that in the position shown in Fig. 2, the shoulder 58 will only begin to enter the slotted portion of the sleeve 42, i.e. when the valve rod 38 is moved to a maximum flow position, as shown in Fig. 2. Stated in another way, the valve rod 38 may be provided with a section 59 of reduced cross sectional area above the valve cone 39 for a distance equal to that described above, thereby forming shoulder 58, the upper end of the valve rod 38 having a diameter approximately equal to the inside diameter of air flow sleeve 42, with sufficient clearance to permit easy sliding movement, it being evident that no sealing problem is present, since if any air flows between valve rod 38 and the upper end of sleeve 42, it will merely join the air flowing through inlet holes 34.

The various positions to which the air control sleeve 42 may be adjusted, and the cooperation of bushing 41 and of valve cone 39 and shoulder 58 on valve rod 38 therewith, are illustrated in Figs. 7–11, inclusive. As in Fig. 7, the air flow sleeve 42 may be threaded into bushing 41 for only a slight distance, as shown in full, in which position the slots 57 permit a maximum flow of air to the valve seat 39. As will be evident, when no pressure is exerted against the air pedal 43, spring 37 will hold the valve rod 38 upwardly with valve cone 39 engaging seat 40; in this position, no air will be supplied to the jar 14. However, when the air pedal 43 is depressed, the valve cone 39 will move away from the seat 40 until the cross sectional area at the seat 40 will be equal to or greater than the cross sectional area of the air inlet holes 34 or sleeve slots 57, whichever is greater, so that a maximum flow of air will take place. As will be evident from Figs. 2 and 7, the area for air admission of slots 57, with sleeve 42 in the full position of Fig. 7 or Fig. 2, may be equal to or greater than the air flow area of holes 34, so that maximum flow will occur whenever valve cone 39 is moved down to a position in which the air flow area between cone 39 and seat 40 equals the maximum air flow area above, which is quickly reached. Also, as cone 39 moves farther downwardly, as to the position of Fig. 2, and until shoulder 58 begins to restrict flow, as described later, maximum air flow will continue.

As will also be evident from Fig. 7, the air control sleeve 42 may be adjusted, by turning, to cause the segments 56 of the sleeve 42 to be threaded farther into the bushing 41, such as until the dotted position of Fig. 7 is reached, at which the smallest adjusted flow of air will be permitted, and at which additional threading of the sleeve into the bushing would cause the ends of segments 56 to protrude beyond seat 40 and prevent seating of cone 39 against seat 40. As illustrated in Fig. 8, additional movement of valve rod 38 does not change the flow of air, for some distance. However, as illustrated in Fig. 9, as the valve rod 38 is further depressed, the shoulder 58 will move along the slots 57, closing off an increasing area of the slots, until the dotted position of Fig. 9 is reached, at which position a flow of air will be permitted, which corresponds to the setting of sleeve 42. Thus, the distance which air pedal 43 extends above throttle pedal 50 is preferably such that when the air pedal 43 is depressed and the throttle pedal 50 is just beginning to be depressed, the shoulder 58 will be at or approaching the dotted position of Fig. 9, such as just entering the bushing 41.

A comparison of the difference, in the cross sectional area of the space within bushing 41 available for the flow of air, between the full and dotted positions of Fig. 9, is illustrated diagrammatically in Figs. 10 and 11. Fig. 10 is an outline of the cross sectional area available for air flow, around the reduced section 59 of the valve rod, when the valve rod is in the full position of Fig. 9, thereby corresponding to a transverse section taken along line 10—10 of Fig. 9, while Fig. 11 is a similar diagram of the cross sectional area available for flow of air when the shoulder 58 has moved into the bushing 41, as in the dotted position of Fig. 9. The area outline of Fig. 10 comprises an annulus 60 combined with four radially spaced, segmental wings 61, the former corresponding to the area around reduced section 59 of rod 38 and out to the perimeter of rod 38 while the latter correspond to the area of slots 57 at the edge of bushing 41. The area outline of Fig. 11 comprises four spaced segments 62, corresponding to wings 61 of Fig. 10 and also corresponding to the area of slots 57. It will be evident, of course, that for other longitudinal positions of sleeve 42, the area diagrams of Figs. 10 and 11 will differ. Thus, for adjustments of sleeve 42 to various positions from the full to the dotted position of Fig. 7, the radial extent of each wing 61 of Fig. 10 and each segment of Fig. 11 will decrease, until the minimum area corresponding to the narrowness of the upper ends of slots 57 is reached.

The value of the adjustability of sleeve 42, and the control of air, particularly the decrease in air flow to a predetermined lower rate of flow as the valve rod 38 is moved downward beyond the maximum flow position, which is automatic when the throttle pedal 50 and the air pedal 43 are depressed together, will be evident. Thus, the comparatively large quantity of air desired for reducing intake manifold vacuum when the engine is used for braking purposes may be supplied through a slight depression of air pedal 43, such as through the first ½" or ¾" of movement, but as soon as the throttle pedal 50 begins to be depressed, when the throttle pedal and air pedal are depressed together, the flow of air will become a predetermined lower rate, determined by the adjustment of sleeve 42. During driving, the operator need make no adjustment of the air flow, since a maximum flow during braking and a regulated flow during driving is obtained.

As will be evident from Fig. 7, the adjustment of the air flow sleeve 42 between the full and dotted positions permits the amount of air to be supplied to the moisture entrainment device to be adjusted in accordance with climatic conditions, as well as the altitude at which the automobile is operating. For locations in which the relative humidity is normally comparatively low, a maximum amount of moisture to be supplied to the engine will be desirable, but during wet weather and in areas where the relative humidity is comparatively high, less air and therefore less moisture will usually be desirable. Adjustment of sleeve 42 is readily made from the passenger compartment of the automobile, since head 55 of sleeve 42 is readily accessible, being disposed just beneath pedal 43, as shown in Fig. 1.

As will further be evident, when the automobile is going down a steep hill, and maximum compression is desirable to enable the engine to be used for braking purposes, the air pedal 43 may be depressed, as described previously, without depressing the throttle pedal 50, and since the valve cone 39 quickly reaches a position of maximum air flow, it will be evident that considerable additional air may be supplied to the intake manifold. As described previously, when the engine is used for braking purposes, the throttle pedal 50 should not be depressed, but the closing of the carburetor throttle valve prevents sufficient air to be supplied to the intake manifold for maximum compression to be developed in the engine, and the braking effect of the engine is thereby reduced by that amount. However, by supplying additional air to the intake manifold, the suction or comparatively high degree of vacuum therein is reduced.

Although a specific embodiment of this invention has been described in detail, and certain variations indicated, it will be understood that other variations may be made therein. Thus, other and different types of valves may be substituted for the conical seating valve shown; a different type of adjustable air control means may be substituted for the air control sleeve; the bushing or other member carrying the valve seat may be made movable with respect to the valve; and additional changes may be made. Thus, it will be understood that other embodiments of this invention may exist, without departing from the spirit and scope thereof.

What is claimed is:

1. In apparatus for supplying moisture and air to an internal combustion engine of an automobile or the like, wherein said automobile has a floor for a passenger compartment and a throttle pedal in said compartment; a moisture supply device having means for producing moistened air, means for supplying such moistened air to said engine, an air control device and means connecting said air control device with said moisture supply device for supplying controlled flow air to the latter, the improvement wherein said air control device comprises a tubular housing threaded internally at each end and provided with a series of air inlet holes spaced from but adjacent its upper end; a cap closing the lower end of said housing which provides a spring abutment and is also provided with a tube connection for said means connecting with said moisture supply device; an internally and externally threaded bushing within said housing just below said air holes, said bushing having a tapered valve seat at its lower end; a sleeve having a threaded lower end engaging the threaded interior of said bushing, the upper end of said sleeve extending a predetermined distance above said housing and the lower end of said sleeve having a series of spaced longitudinal slots forming segments, said slots being widest at the lower end of said bushing and the walls of each slot converging to a parallel walled portion at the upper end of said slots, said slots forming passages for air of decreasing size as said sleeve is threaded into said bushing; a valve rod extending into said housing from the upper end and also extending above said housing for a predetermined distance, said valve rod having within said housing a conical valve whose underside provides a spring abutment and a section of reduced diameter above said valve extending to a shoulder, the inside diameter of said sleeve corresponding to the diameter of said valve rod above said shoulder, and the upper end of said rod being provided with a head forming an air pedal, said valve rod when moved longitudinally of said bushing causing said valve to move downwardly away from said seat so that the flow of air increases to a maximum, but decreases to a predetermined lower rate established by said sleeve slots when said shoulder approaches and enters the upper end of said bushing upon further downward movement of said valve rod; a compression spring extending between said abutments at said cap and the underside of said valve; means including a tubular bushing surrounding said sleeve for attaching said housing to said floor with the upper end of said sleeve disposed in said passenger compartment for access for adjustment, and with said valve rod positioned alongside said throttle pedal and said air pedal normally disposed above the same, so that said air pedal and throttle pedal may be depressed independently or simultaneously and further so that when said pedals are depressed simultaneously said valve rod will be in said predetermined lower flow rate position.

2. In apparatus for supplying moisture and air to an internal combustion engine, including a moisture supply device having means for producing moistened air, means for supplying such moistened air to said engine, an air control device and means connecting said air control device with said moisture supply device for supplying controlled flow air to the latter, the improvement wherein said moisture supply device comprises a cylindrical jar adapted to contain water and having a top; a substantially U-shaped tube having a first leg extending downwardly through said top to the lower portion of said jar and a second leg extending upwardly to the upper portion of said jar, the lower ends of said legs being connected by a horizontal lower portion of said tube, said tube having in its lower portion a pair of aspirating holes for water to enter said tube and to be carried with said air; an outlet tube extending downwardly through said top to the upper end of said second leg of said inlet tube and interfitting therewith, said outlet tube having a first series of laterally spaced holes above the normal level of water in said jar and a second series of laterally spaced holes above said first series of holes, said outlet tube being plugged between said first and second series of holes; a cylindrical cartridge of compacted metal fibers disposed about said outlet tube and said first series of holes; and a circular baffle plate having a diameter slightly less than the inside of said jar and mounted in horizontal position on said outlet tube above said cartridge but below said second series of holes, said cartridge tending to divide and subdivide water forced therethrough from said first series of holes, and said baffle forming an annular opening spaced from said cartridge through which air and moisture are forced to pass before entering said second series of holes for passage through the upper end of said outlet tube.

3. Apparatus for supplying moisture and air to an internal combustion engine of an automobile or the like having a throttle pedal for said engine, comprising a moisture supply device having means for producing moistened air; means for supplying such moistened air to said engine; an air control device having valve means for controlling the flow of air, said valve means having successive positions in which the flow of air first increases to a maximum and then decreases to a predetermined lower rate at additional positions; means connecting said air control device with said moisture supply device for supplying such controlled flow air to the latter; and an air flow control pedal positioned alongside said throttle pedal and normally disposed above the same, so that said air pedal and throttle pedal may be depressed independently or simultaneously and further so that when said pedals are depressed simultaneously said valve means will be in said predetermined lower flow rate position.

4. Apparatus for supplying moisture and air to an internal combustion engine of an automobile or the like, comprising a moisture supply device having means for producing moistened air; means for supplying such moistened air to said engine; an air control device having valve means for controlling the flow of air, said valve means including a valve seat and having successive positions in which the flow of air increases to a maximum from an initial rate less than the maximum and then decreases to a predetermined lower rate at additional positions, said air control device also having additional adjustable means for regulating the amount of air flowing at the lower flow position of said valve means and including a tubular sleeve having a plurality of longitudinally extending slots adjacent one end thereof and an annular member forming said valve seat and disposed axially of said sleeve and said sleeve and member being adjustable to different relative positions to expose different amounts of said slots in accordance with the relative longitudinal positions of said member and sleeve; and means connecting said air control device with said moisture supply device for supplying such controlled flow air to the latter.

5. Apparatus for supplying moisture and air to an internal combustion engine of an automobile or the like, comprising a moisture supply device having means for producing moistened air; means for supplying such moistened air to said engine; an air control device having valve means for controlling the flow of air, said valve means including a valve seat and having successive positions in which the flow of air increases to a maximum from an initial rate less than the maximum and then decreases to a predetermined lower rate at additional positions, said air control device also having additional adjustable means for regulating the amount of air flowing at the lower flow position of said valve means and including a tubular sleeve having a plurality of longitudinally extending slots adjacent one end thereof, said slots being wider adjacent the end of said sleeve and the sides of said slots for a predetermined distance approaching more closely as the distance from said end increases, the sides of said slots beyond such predetermined distance being substantially parallel, and an annular member forming said valve seat, and disposed axially of said sleeve, said member and said sleeve being adjustable to different relative longitudinal positions to expose different amounts of said slots in accordance with the relative longitudinal positions of said member and sleeve; and means connecting said air control device with said moisture supply device for supplying such controlled flow air to the latter.

6. Apparatus for supplying moisture and air to an internal combustion engine of an automobile or the like, comprising a moisture supply device having means for producing moistened air; means for supplying such moistened air to said engine; an air control device having valve means for controlling the flow of air, said valve means including a tubular member having a valve seat at its lower end and a valve rod extending through said tubular member and provided with closure means cooperating with said valve seat, and a shoulder spaced from said closure means, said valve rod when moved longitudinally of said tubular member causing said closure means to move away from said seat so that the flow of air increases to a maximum and continues substantially at a maximum during predetermined additional movement of said rod, but decreases when said shoulder approaches and enters the upper end of said tubular member upon further movement of said valve rod; and means connecting said air control device with said moisture supply device for supplying such controlled flow air to the latter.

7. Apparatus for supplying moisture and air to an internal combustion engine of an automobile or the like, as defined in claim 6, wherein said air control device includes a sleeve adjustable with respect to said tubular member and provided with longitudinal slots for controlling air flow.

8. Apparatus for supplying moisture and air to an internal combustion engine of an automobile or the like having a throttle pedal for said engine, comprising a moisture supply device having means for producing moistened air; means for supplying such moistened air to said engine; an air control device having valve means for controlling the flow of air, said valve means including a tubular member having a valve seat at its lower end and a valve rod extending through said tubular member and provided with closure means cooperating with said valve seat, and a shoulder spaced from said closure means, said valve rod when moved longitudinally of said tubular member causing said closure means to move away from said seat so that the flow of air increases to a maximum and continues substantially at a maximum during predetermined additional movement of said rod, but decreases to a predetermined lower rate when said shoulder approaches and enters the upper end of said tubular member, and said air control device including a sleeve adjustable with respect to said tubular member and provided with longitudinal slots for controlling the lower rate of flow of air to said tubular member and through said valve means, said sleeve surrounding said valve rod and said valve rod terminating at its upper end in an air flow control pedal positioned alongside said throttle pedal and normally disposed above the same, so that said air pedal and throttle pedal may be depressed independently or simultaneously and further so that when said pedals are depressed simultaneously said valve means will be in said lower rate of flow position, and said sleeve terminating in an accessible position for adjustment thereof; and means connecting said air control device with said moisture supply device for supplying such controlled flow air to the latter.

9. In apparatus for supplying moisture and air to an internal combustion engine, a moisture supply device comprising a jar adapted to contain water; a substantially U-shaped tube having a first leg extending downwardly to the lower portion of said jar and a second leg extending upwardly to the upper portion of said jar, the lower ends of said legs being connected by a lower portion of said tube, said tube having in said lower portion at least one water inlet hole; a tube connecting with the upper end of said second leg and having at least one discharge opening above the normal water level in said jar; a cartridge of compacted fibers of metal or the like enclosing said discharge opening; and an outlet for moisture laden air for removing the same from the upper portion of said jar above said normal water level.

10. In apparatus for supplying moisture and air to an internal combustion engine, a moisture supply device comprising a jar adapted to contain water and having a top; an outlet tube extending downwardly through said top and having a first series of laterally spaced holes above the normal level of water in said jar and a second series of laterally spaced holes above said first series of holes, said outlet tube being plugged between said first and second series of holes; means enclosing said first series of holes for dividing and subdividing water forced therethrough from said first series of holes; and means connected to the lower end of said outlet tube for supplying air and carrying water thereto.

11. In apparatus for supplying moisture and air to an internal combustion engine, as defined in claim 10, including a baffle plate mounted in horizontal position on said outlet tube above said dividing means but below said second series of holes.

12. In apparatus for supplying moisture and air to an internal combustion engine of an automobile or the like, including a moisture supply device having means for producing moistened air, means for supplying such moistened air to said engine, and an air control device for controlling the flow of air, the improvement wherein said air control device comprises a valve movable from a closed position to flow increasing positions and then to successive open positions of substantially maximum flow; means cooperating with said valve when in otherwise successive maximum flow positions for causing the flow of air to decrease to a predetermined amount after said valve has moved past the initial position of substantially maximum flow and to maintain such decreased flow of predetermined amount for additional successive positions of otherwise substantially maximum flow of said valve; and means for moving said valve from closed position to flow increasing positions, then to sucessive open positions of substantially maximum flow and simultaneously effecting the operation of said cooperating means.

References Cited in the file of this patent

UNITED STATES PATENTS

| | | |
|---|---|---|
| 443,155 | Wallace | Dec. 23, 1890 |
| 1,178,913 | Garber | Apr. 11, 1916 |
| 1,497,101 | Krider | June 10, 1924 |
| 1,505,254 | Goetz | Aug. 19, 1924 |
| 1,537,284 | Ayers | May 12, 1925 |
| 1,822,962 | Ennis et al. | Sept. 15, 1931 |
| 1,841,839 | Morton | Jan. 19, 1932 |
| 2,004,385 | Thomas | June 11, 1935 |
| 2,018,131 | Kamrath | Oct. 22, 1935 |
| 2,045,113 | Ward | June 23, 1936 |
| 2,321,879 | Valdez | June 15, 1943 |
| 2,329,820 | Breese | Sept. 21, 1943 |
| 2,428,277 | Heidbrink | Sept. 30, 1947 |
| 2,474,083 | Zimmerman | June 21, 1949 |
| 2,521,576 | Fresolone | Sept. 5, 1950 |
| 2,530,195 | Giacobello | Nov. 15, 1950 |
| 2,603,466 | Anderson | July 15, 1952 |
| 2,632,637 | Stone | Mar. 24, 1953 |
| 2,672,883 | Dillman | Mar. 23, 1954 |